US009269271B2

(12) United States Patent
Chong et al.

(10) Patent No.: US 9,269,271 B2
(45) Date of Patent: Feb. 23, 2016

(54) SYSTEM AND METHOD FOR PREVENTING COLLISION (71) Applicant: Hyundai Motor Company, Seoul (KR)

(72) Inventors: Hyok Jin Chong, Gyeonggi-do (KR); Jin Ho Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 244 days.

(21) Appl. No.: 13/688,261

(22) Filed: Nov. 29, 2012

(65) Prior Publication Data
US 2014/0005904 A1  Jan. 2, 2014

(30) Foreign Application Priority Data
Jun. 29, 2012  (KR) .......................... 10-2012-0070844

(51) Int. Cl.
    *G08G 1/16*     (2006.01)
    *B60T 7/22*     (2006.01)
    *B62D 15/02*    (2006.01)
    *B60W 30/06*    (2006.01)
    *B60W 10/184*   (2012.01)
    *B60W 10/20*    (2006.01)

(52) U.S. Cl.
    CPC . *G08G 1/168* (2013.01); *B60T 7/22* (2013.01); *B60W 10/184* (2013.01); *B60W 10/20* (2013.01); *B60W 30/06* (2013.01); *B62D 15/0285* (2013.01); *B60W 2550/10* (2013.01); *B60W 2710/182* (2013.01); *B60W 2720/103* (2013.01); *B60W 2720/106* (2013.01)

(58) Field of Classification Search
    CPC .......................... B60K 31/0008; B60W 30/06
    USPC .......... 701/36, 46, 70, 96, 400, 4, 2; 340/435, 340/436, 465, 905, 932.2
    See application file for complete search history.

(56) References Cited

U.S. PATENT DOCUMENTS

| 2002/0054159 | A1  | 5/2002 | Obradovich |
| 2007/0132563 | A1* | 6/2007 | Balbale et al. ............... 340/435 |
| 2008/0009990 | A1* | 1/2008 | Katoh et al. ................. 701/36 |
| 2009/0091475 | A1* | 4/2009 | Watanabe et al. .......... 340/932.2 |
| 2009/0132143 | A1* | 5/2009 | Kamiya et al. ................ 701/96 |
| 2009/0178876 | A1* | 7/2009 | Miki et al. ................... 180/411 |

FOREIGN PATENT DOCUMENTS

| JP | 6148328 A       | 5/1994 |
| JP | 2001191877 A    | 7/2001 |
| JP | 2006-306233 A   | 11/2006 |
| JP | 2007125981 A    | 5/2007 |
| JP | 2008-149853 A   | 7/2008 |
| KR | 100576225 B1    | 5/2006 |
| KR | 10-2011-0055229 A | 5/2011 |
| KR | 10-2012-0060275 A | 6/2012 |

* cited by examiner

*Primary Examiner* — Helal A Algahaim
*Assistant Examiner* — Jelani Smith
(74) *Attorney, Agent, or Firm* — Mintz Levin Cohn Ferris Glovsky and Popeo, P.C.; Peter F. Corless (57) ABSTRACT

Disclosed is a system and a method for preventing collision through substantial vehicle control while providing warning to a driver by determining collision danger using vehicle information and environment information and controlling vehicle speed with vehicle target speed computed through determination logic.

21 Claims, 7 Drawing Sheets

[DISTANCE-VEHICLE SPEED TABLE]

| VALID BRAKE DISTANCE | 0.10 | 0.20 | 0.30 | 0.40 | 0.50 | 0.60 | 0.70 | 0.80 | 0.90 | 1.00 | 1.10 | 1.20 | 1.30 | 1.40 |
|---|---|---|---|---|---|---|---|---|---|---|---|---|---|---|
| MAXIMUM SPEED | 0.53 | 0.75 | 0.92 | 1.07 | 1.19 | 1.31 | 1.41 | 1.51 | 1.60 | 1.69 | 1.77 | 1.85 | 1.92 | 1.99 |
| KPS CONVERSION | 1.92 | 2.71 | 3.32 | 3.84 | 4.29 | 4.70 | 5.08 | 5.43 | 5.76 | 6.07 | 6.36 | 6.65 | 6.92 | 7.18 |
| TOTAL BRAKE DISTANCE | 0.26 | 0.43 | 0.58 | 0.73 | 0.86 | 1.00 | 1.13 | 1.26 | 1.39 | 1.52 | 1.64 | 1.76 | 1.89 | 2.01 |

[DISTANCE-VEHICLE SPEED TABLE]

| VALID BRAKE DISTANCE | 0.10 | 0.20 | 0.30 | 0.40 | 0.50 | 0.60 | 0.70 | 0.80 | 0.90 | 1.00 | 1.10 | 1.20 | 1.30 | 1.40 |
|---|---|---|---|---|---|---|---|---|---|---|---|---|---|---|
| MAXIMUM SPEED | 0.53 | 0.75 | 0.92 | 1.07 | 1.19 | 1.31 | 1.41 | 1.51 | 1.60 | 1.69 | 1.77 | 1.85 | 1.92 | 1.99 |
| KPS CONVERSION | 1.92 | 2.71 | 3.32 | 3.84 | 4.29 | 4.70 | 5.08 | 5.43 | 5.76 | 6.07 | 6.36 | 6.65 | 6.92 | 7.18 |
| TOTAL BRAKE DISTANCE | 0.26 | 0.43 | 0.58 | 0.73 | 0.86 | 1.00 | 1.13 | 1.26 | 1.39 | 1.52 | 1.64 | 1.76 | 1.89 | 2.01 |

SYSTEM AND METHOD FOR PREVENTING COLLISION

CROSS-REFERENCE

This application is based on and claims priority from Korean Patent Application No. 10-2012-0070844, filed on Jun. 29, 2012, the entire contents of which are incorporated herein by reference.

BACKGROUND OF THE INVENTION

1. Field of the Invention

The present invention relates to a system and a method for preventing collision, and more particularly, to a system and a method for computing vehicle target speed by determining collision danger using vehicle information and environmental information and achieving the vehicle target speed by active control.

2. Description of the Related Art

In recent years, with an increase in availability of vehicles with parking assist systems, such as a smart parking assist system (SPAS) or a front and rear parking assist system (FRPAS), parking convenience for a driver has increased.

The FRPAS is a system which senses a distance with respect to an obstacle when car speed is low such as during parking, by an ultrasonic sensor and outputs an alarm sound to a driver indicating a close distance to the obstacle. Since the FRPAS uses the ultrasonic sensor, it may alarm a driver of potential collision danger and may be offered at a low cost. However, because a subject listening to an alarm sound and operating a vehicle may be a driver, it may be difficult to prevent collision due to potential erroneous operation and wrong parking adjustment by the driver.

A parking assist system has been developed for less experienced drivers, wherein the system offers automatic and supportive steering control.

The parking assist system scans a parking space using a long distance ultrasonic sensor mounted at a side of a vehicle; generates a track from a current location of the vehicle to the parking space; and automatically supports steering wheel control such that the driver may park the vehicle in a target parking space. Although such a system reduces burden of the user during parking, the system cannot control vehicle speed, making it difficult to prevent collision due to an insufficient operation or erroneous operation by the driver.

SUMMARY OF THE INVENTION

Accordingly, the present invention has been made in view of the above problems, and provides a system and a method for preventing collision of a vehicle while maintaining appropriate speed of the vehicle by determining collision danger at a multi-angle using current vehicle information and parking environment information.

The present invention further provides a system for preventing collision through substantial vehicle control simultaneously with raising awareness to a driver by controlling vehicle target speed computed by determination logic which identifies collision danger.

In accordance with an aspect of the present invention, a system for preventing collision of a vehicle, includes various determinators executed by a processor. These determinators include: a map based collision determinator for outputting first vehicle target speed using a map with respect to a parking space and a current location of the vehicle; a front and rear parking assist system (FRPAS)-vehicle speed based collision determinator for outputting second vehicle target speed using a measured value of an FRPAS and current vehicle speed; an FRPAS stop determinator for outputting third vehicle target speed using the measured value of the FRPAS; a vehicle speed excess stop determinator for determining whether the current vehicle speed exceeds a preset reference vehicle speed to output fourth vehicle target speed; and collision prevention operation manager for receiving at least one of the first vehicle target speed, the second vehicle target speed, the third vehicle target speed, and the fourth vehicle target speed and computing a final vehicle target speed with reference to input target speeds.

In accordance with another aspect of the present invention, a method for preventing collision of a vehicle, includes: outputting first vehicle target speed using a map corresponding to a parking space and a current location of the vehicle; outputting second vehicle target speed using a measured value of a front and rear parking assist system (FRPAS) and current vehicle speed; outputting third vehicle target speed using the measured value of the FRPAS; determining whether the current vehicle speed exceeds a preset reference vehicle speed to output fourth vehicle target speed; and receiving at least one of the first vehicle target speed, the second vehicle target speed, the third vehicle target speed, and the fourth vehicle target speed and computing a final vehicle target speed with reference to input target speeds.

BRIEF DESCRIPTION OF THE DRAWINGS

The above and other objects, features and advantages of the present invention will now be more clearly understood from the following detailed description taken in conjunction with the accompanying drawings, in which.

Like reference numerals designate like structural elements.

DESCRIPTION OF PREFERRED EMBODIMENTS

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although the below exemplary embodiments are described as using a plurality of units to perform the above process, it is understood that the above processes may also be performed by a single controller or unit. Additionally, it is well understood that a single controller or a plurality of controllers may be utilized to execute each of the above described units. Accordingly, these units may be embodied as hardware or software which is executed by a controller.

Furthermore, the control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Exemplary embodiments of the present invention are described herein with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
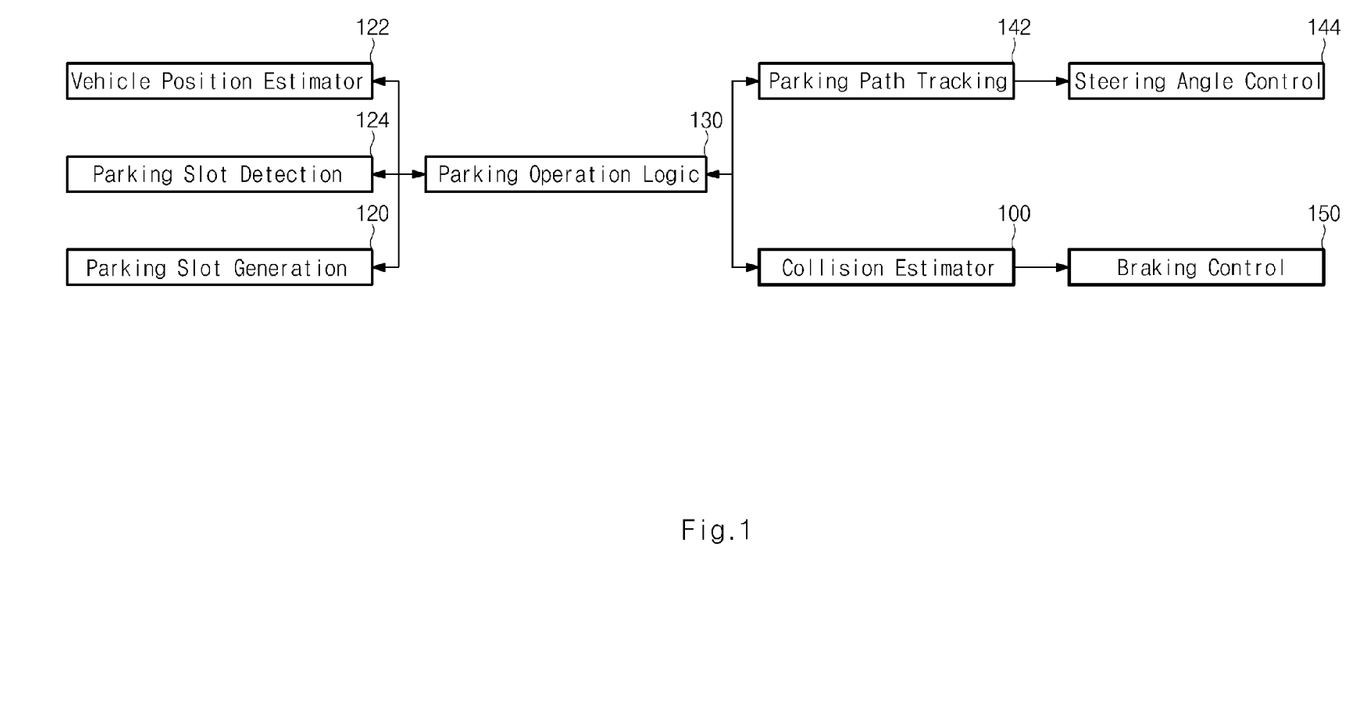
FIG. 1 is an exemplary block diagram illustrating a system for preventing collision according to an exemplary embodiment of the present invention.

FIG. 1 is an exemplary block diagram illustrating a system for preventing collision according to an exemplary embodiment of the present invention. A smart parking assist system (SPAS) is a system which scans a possible parking region and controls a steering wheel to assist in parking using an ultrasonic sensor, mounted at a front, rear, left, or right side of a vehicle. A collision estimator 100 and a braking control module 150 of the present invention may be operatively associated with parking operation logic 130 in a SPAS system and may be executed by a processor. In particular, the collision estimator 100 and the braking control module 150 may use a parking slot detector 124, and a parking path generator 120 of the SPAS system to determine prevention of collision, which uses information input from a vehicle position estimator 122, executed by a processor. During braking of a vehicle, a parking path tracking module 142 and a steering angle controller 144 of an existing SPAS system cooperate with a braking control module 150 to control braking.

The collision estimator 100, executed by a processor, may define collision reference speed using front and rear obstacle information and location information of a subject vehicle, and determine a danger degree of collision using vehicle speed information, location information of a subject vehicle, information acquired from a parking assist system (PAS), and information acquired from SPAS. In particular, the collision estimator 100 may determine a danger degree of collision to output a vehicle target speed for preventing a potential collision. A procedure of computing vehicle target speed will be described in detail below.

The braking control module 150, executed by a processor, may receive the vehicle target speed from the collision estimator 100 to control acceleration of a vehicle, thereby adjusting the vehicle speed to the target speed. In particular, the braking control module 150 outputs vehicle target information to a brake actuator to apply brake pressure, or perform a acceleration or a deceleration control, and monitors a state of a brake actuator.

Figure 2:
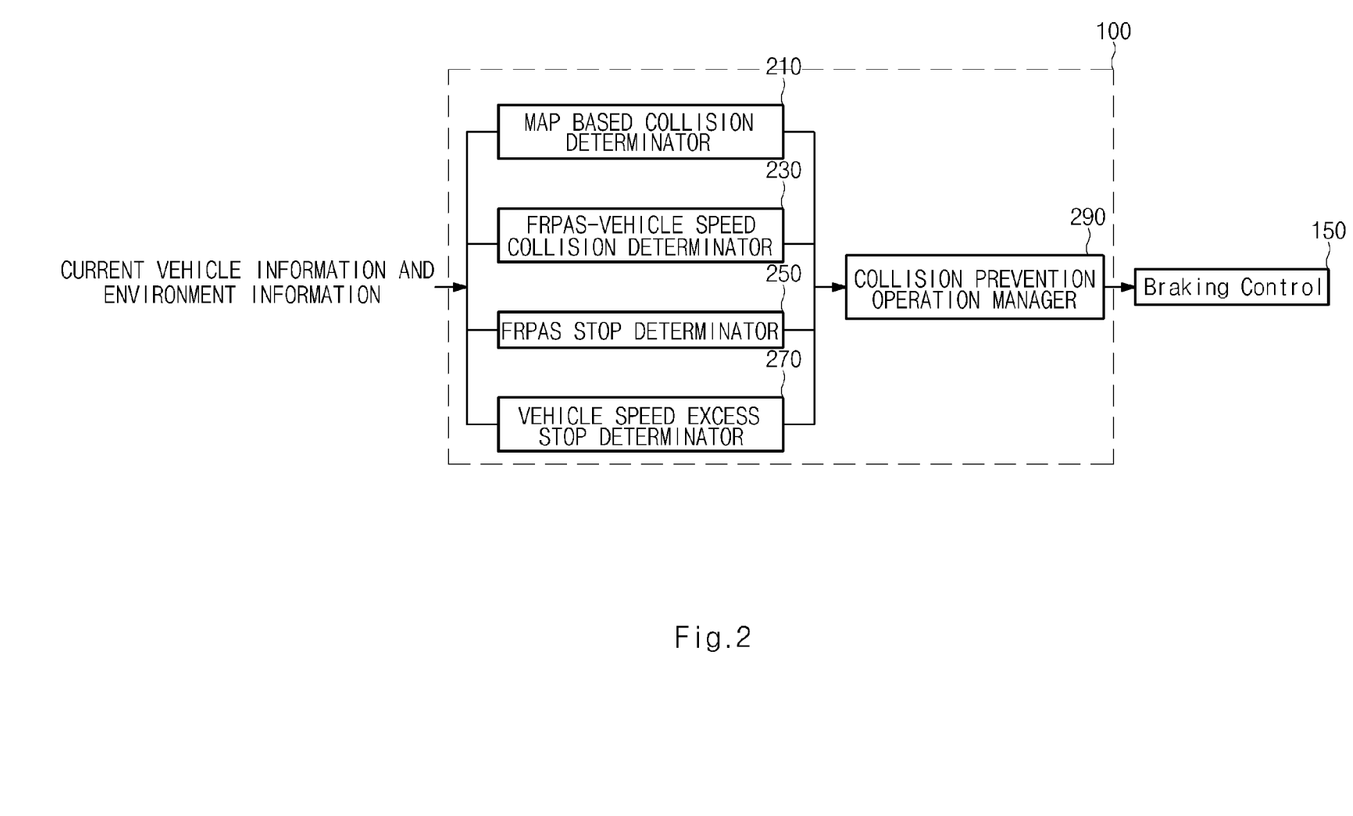
FIG. 2 is an exemplary block diagram illustrating constituent elements of a system for preventing collision according to an exemplary embodiment of the present invention.

FIG. 2 is an exemplary block diagram illustrating constituent elements of a system for preventing collision according to an exemplary embodiment of the present invention. The collision estimator 100 according to the present invention may include a map based collision determinator 210, a FRPAS-vehicle speed collision determinator 230, a FRPAS stop determinator 250, a vehicle speed excess stop determinator 270, and a collision prevention operation manager 290, which may be executed by a processor. Vehicle target speed computed from the collision prevention operation manager 290 may be output to the braking control module 150.

First, current vehicle information (e.g., vehicle information sensed using a distance sensor and a SPAS) and environment information may be input to the collision estimator 100. Conventionally, to sense a distance between a vehicle and an obstacle, near distance ultrasonic sensor information is used. However, a challenge with such a sensor may be the short distance sensing (e.g., 1~2 m). Accordingly, the present invention discloses a system wherein the collision estimator 100 may receive peripheral environment information of a vehicle from an existing distance sensor and a SPAS system. The SPAS system may scan a parking space to configure a map of an object of the parking space using various input information.

For example, input information may include FRPAS measuring information (e.g., FPAS_Warning_Flag information, RPAS_Warning_Flag information), transmission information, subject vehicle location information (X, Y, θ), vehicle speed information, and length information of a parking space. In one embodiment, at least one of the input information may be input to at least one of the map based collision determinator 210, the FRPAS-vehicle speed collision determinator 230, the FRPAS stop determinator 250, the vehicle speed excess stop determinator 270, and the collision prevention operation manager 290 to be applied to respective computing schemes. In another embodiment, all or a part of the map based collision determinator 210, the FRPAS-vehicle speed collision determinator 230, the FRPAS stop determinator 250, and the vehicle speed excess stop determinator 270 may be provided, or at least one determinator may be integrated therewith.

The map based collision determinator 210, executed by a processor, determines a potential collision using length information of a target parking space, subject vehicle location information (X, Y, θ), vehicle speed information as a result of scanning a parking space. The map based collision determinator 210 may generate a map with respect to a parking space using input information and may compute a distance using a current location of the vehicle (subject vehicle location information) to determine presence of a potential collision and to compute a vehicle target speed for preventing the collision.

The FRPAS-vehicle speed collision determinator 230, executed by a processor, determines presence of the potential collision and computes a vehicle target speed using a measuring value through a FRPAS and vehicle speed information. For example, the measured value through the FRPAS may be a remaining distance to the obstacle, and the FRPAS-vehicle speed collision determinator 230 may compute vehicle target speed for preventing collision using the remaining distance and vehicle speed information.

When a protruded object is detected, the FRPAS stop determinator 250, executed by a processor, may stop the vehicle. The FRPAS stop determinator 250 may measure a remaining distance to the obstacle, and a vehicle target speed (e.g., vehicle is 0 km/h) using a current location of the vehicle and a vehicle speed. When vehicle speed exceeds predetermined limit vehicle speed, (i.e., excess speed), the vehicle speed excess stop determinator 270, executed by a processor, may output vehicle target speed to limit vehicle speed.

The collision prevention operation manager 290, executed by a processor, may compare vehicle target speeds output from the map based collision determinator 210, the FRPAS-vehicle speed collision determinator 230, the FRPAS stop determinator 250, the vehicle speed excess stop determinator 270 with each other, and may output an optimal vehicle target speed necessary for a collision prevention operation. In one embodiment, a minimum vehicle target speed among vehicle target speeds output from the map based collision determinator 210, the FRPAS-vehicle speed collision determinator 230, the FRPAS stop determinator 250, the vehicle speed excess stop determinator 270 may be computed as a final vehicle target speed, and may be output to a braking control module 150. In another embodiment, the FRPAS stop determinator 250 and the vehicle speed excess stop determinator 270 may receive vehicle target speed and may compare only vehicle target speeds output from the map based collision determinator 210, the FRPAS-vehicle speed collision determinator 230 with each other to output a final vehicle target speed (e.g., when a sudden stop may be required). In addition, the collision prevention operation manager 290 may receive vehicle target speed from determinators in various combinations to compute final vehicle target speed, and may manually activate or deactivate partial determinators according to selection of a driver.

The braking controller 150 may receive final target vehicle speed from the collision prevention operation manager 290 as input, and may brake a vehicle to obtain corresponding final vehicle target speed.

As described herein, an existing parking support system provides only information with respect to a near distance obstacle using an ultrasonic wave distance sensor. In the present invention, determinators may compute vehicle target speed using separate determinations and may output optimal vehicle target speed, thereby enabling substantially precise control and improving an existing parking support system.

Vehicle target speed output processes of respective determinators 210, 230, 250, and 270 will now be further described. For having a better understanding of the invention, it is assumed that vehicle target speed output from the map based collision determinator 210 may be a first vehicle target speed, vehicle target speed output from the FRPAS-vehicle speed collision determinator 230 may be a second vehicle target speed, vehicle target speed output from the FRPAS stop determinator 250 may be a third vehicle target speed, and vehicle target speed output from the vehicle speed excess stop determinator 270 may be a fourth vehicle target speed.

Figure 3A:
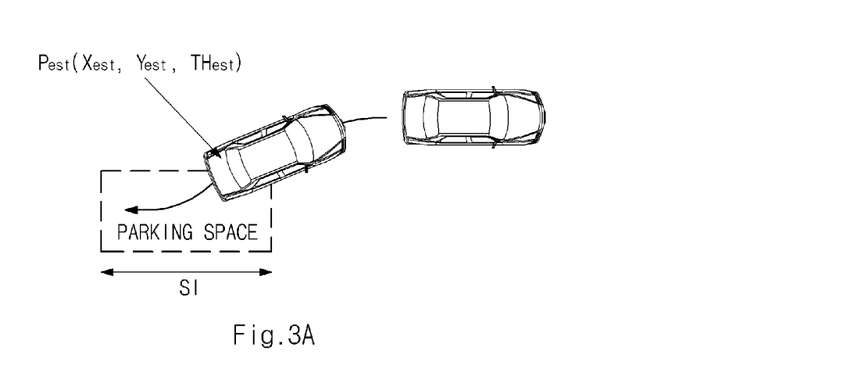
FIGS. 3A-3C are exemplary diagrams illustrating first vehicle target speed output of a map based collision determinator according to an exemplary embodiment of the present invention.
Figure 3B:
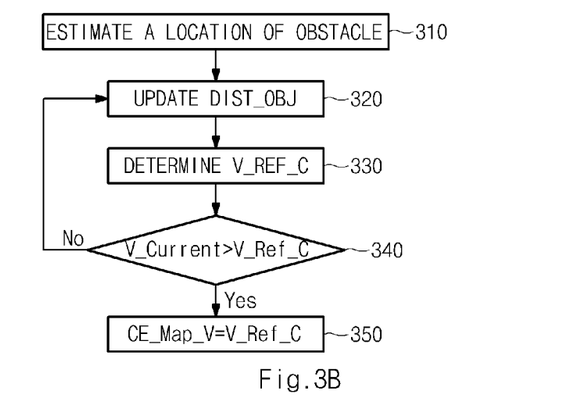
Figure 3C:
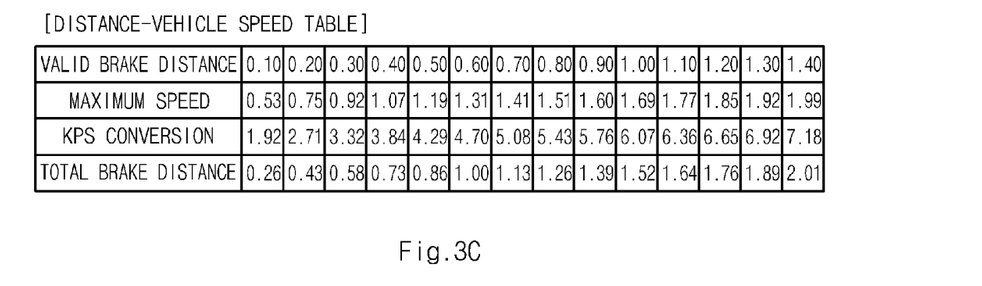

FIG. 3 is an exemplary diagram illustrating first vehicle target speed output of a map based collision determinator according to an exemplary embodiment of the present invention. FIG. 3A illustrates an example of parking using the map based collision determinator 210, FIG. 3B is an exemplary flowchart illustrating map based collision determination, and FIG. 3C illustrates a distance-vehicle speed table which may be used to determine reference vehicle speed.

Referring to FIGS. 3A and 3B, the map based collision determinator 210 may scan and display a parking space (shown by a dotted line), and estimate a location of an obstacle using length information (SI) of the parking space (310). Although only the length information (SI) is shown in FIG. 3, a width (e.g., horizontal length of parking space) as well as length information (e.g., vertical length of parking space) may be considered.

After estimating a location of an obstacle using length information (SI) of the parking space, the map based collision determinator 210 may measure location information Pest (e.g., Xest, Yest, THest) of a vehicle moving backward to update a remaining distance Dist_Obj from a location of the vehicle to an obstacle (320). Moreover, with respect to remaining distance, as shown in FIG. 3C, reference vehicle speed V_Ref_C may be determined using a distance-vehicle speed table (330). The distance-vehicle speed table is a table illustrating vehicle speed with respect to a measured distance and may vary according to a type of vehicle. After determining reference vehicle speed, the map based collision determinator 210 may compare current vehicle speed V_Current with reference vehicle speed. When the current vehicle speed is greater than the reference vehicle speed V_Ref_C (e.g., V_Current>V_Ref_C 340), the map based collision determinator 210 may output the reference vehicle speed as first vehicle target speed CE_Map_V (e.g., CE_Map_V=V_Ref_C 350). The output first vehicle target speed may be input to a collision prevention operation manager 290.

Figure 4A:
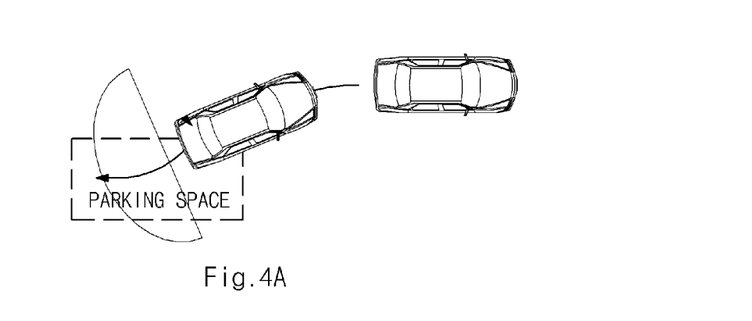
FIGS. 4A-4C are exemplary diagrams illustrating second vehicle target speed output of an FRPAS-vehicle speed collision determinator according to an exemplary embodiment of the present invention.
Figure 4B:
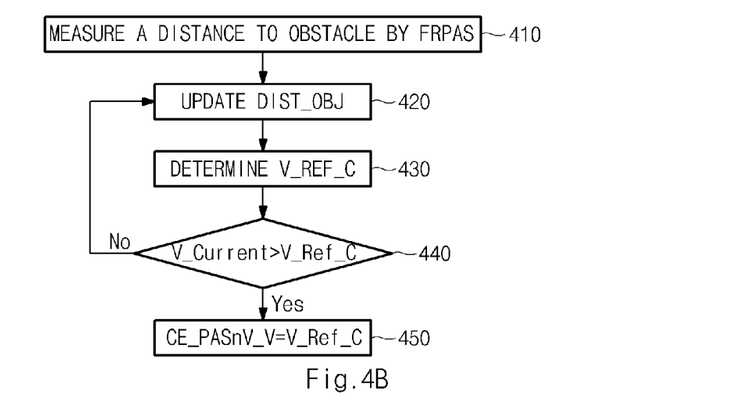
Figure 4C:
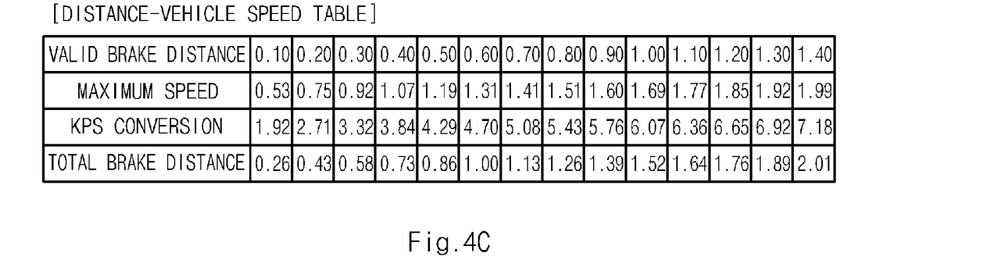

FIG. 4 is an exemplary diagram illustrating second vehicle target speed output of an FRPAS-vehicle speed collision determinator 230 according to an exemplary embodiment of the present invention. FIG. 4A illustrates an example of parking using the FRPAS-vehicle speed collision determinator 230, FIG. 4B is an exemplary flowchart illustrating FRPAS-vehicle speed collision determination, and FIG. 4C illustrates a distance-vehicle speed table which may be used to determine reference vehicle speed.

The FRPAS-vehicle speed collision determinator 230 may compute vehicle target speed based on information and vehicle speed obtained through a FRPAS. For example, the information obtained through the FRPAS refers to a measured distance to the obstacle (410) obtained by sensing an obstacle in a front or a rear direction of a vehicle using a rear camera and/or an ultrasonic sensor. The FRPAS-vehicle speed collision determinator 230 may receive a measured distance to the obstacle to update a remaining distance Dist_Obj to the obstacle (420). Furthermore, in the same manner as the map based collision determination, the FRPAS-vehicle speed collision determinator 230 may determine reference vehicle speed V_Ref_C using the distance-vehicle speed table (430) (FIG. 4C). After that, the FRPAS-vehicle speed collision determinator 230 may compare current vehicle speed V_Current with reference vehicle speed V_Ref_C. When the current vehicle speed is greater than the reference vehicle speed (e.g., V_Current>V_Ref_C 440), the FRPAS-vehicle speed collision determinator 230 may determine the reference vehicle speed as second vehicle target speed (e.g., V_Ref_C=CE_PASnV_V 450).

In an embodiment shown in FIGS. 3 and 4, a vehicle target speed is output only when current vehicle speed exceeds the reference vehicle speed. In another embodiment, when the current vehicle speed does not exceed the reference vehicle speed, vehicle target speed may be output as a null value or no value.

Figure 5A:
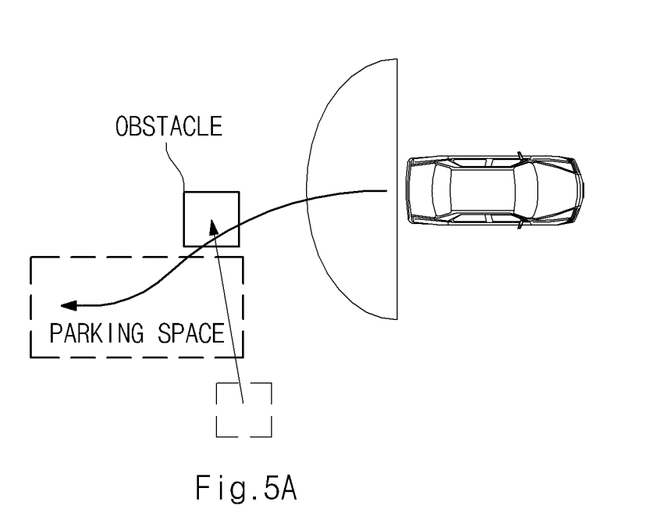
FIGS. 5A-5B are exemplary diagrams illustrating third vehicle target speed output of an FRPAS stop determinator according to an exemplary embodiment of the present invention.
Figure 5B:
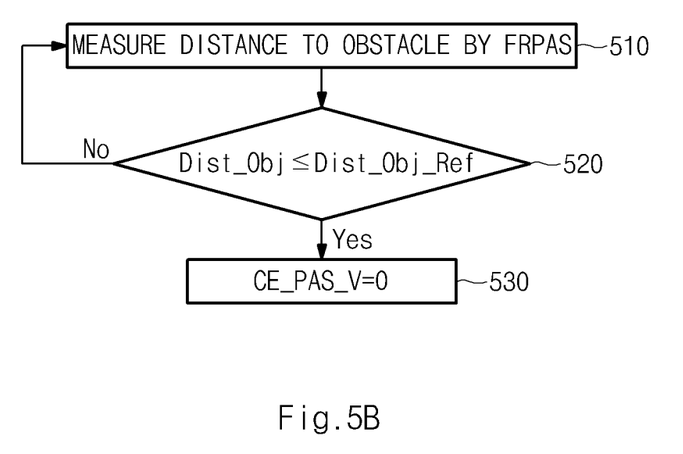

FIG. 5 is an exemplary diagram illustrating third vehicle target speed output of an FRPAS stop determinator 250 according to an exemplary embodiment of the present invention. FIG. 5A illustrates an example of parking using the FRPAS stop determinator 250, and FIG. 5B is an exemplary flowchart illustrating FRPAS stop collision determination.

The FRPAS stop determinator 250 may measure a distance to an obstacle using an ultrasonic sensor and/or a rear camera of a FRPAS 510. However, the FRPAS stop determination may preferably be used to respond when a sudden obstacle is detected or the obstacle approaches nearby.

Unlike the map based collision determination and the FRPAS-vehicle speed based collision determination, the reference distance Dis_Obj_ref may initially be determined, for example, the reference distance may be set as a proximal distance of about 50 centimeters. Furthermore, the reference distance may be changed by a user. The FRPAS stop determinator 250 may determine whether the measured distance to the obstacle is less than or equal to the reference distance (e.g. Dist_Obj≥Dist_Obj_Ref 520). When the measured distance Dist_Obj to the obstacle is less than the reference distance Dist_Obj_Ref, the FRPAS stop determinator 250 may sense a potential collision and may output third vehicle target speed of zero indicating a stop. For instance, when the reference distance is set to 50 centimeters and a distance to an obstacle measured by the FRPAS is 40 centimeters, FRPAS stop determinator 250 outputs vehicle target speed of zero for stopping the vehicle. Such stop determination may cooperate with another collision determinator to actively respond to a sudden obstacle.

In this embodiment, the FRPAS stop determination outputs vehicle target speed of zero only when a distance to the obstacle is less than the reference distance. In another embodiment, when the distance to the obstacle is greater than the reference distance, a null value may be output.

Figure 6A:
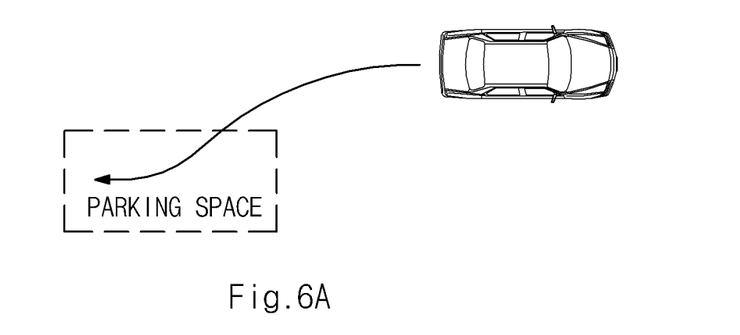
FIGS. 6A-6B are exemplary diagrams illustrating fourth vehicle target speed output of a vehicle speed excess stop determinator according to an exemplary embodiment of the present invention.
Figure 6B:
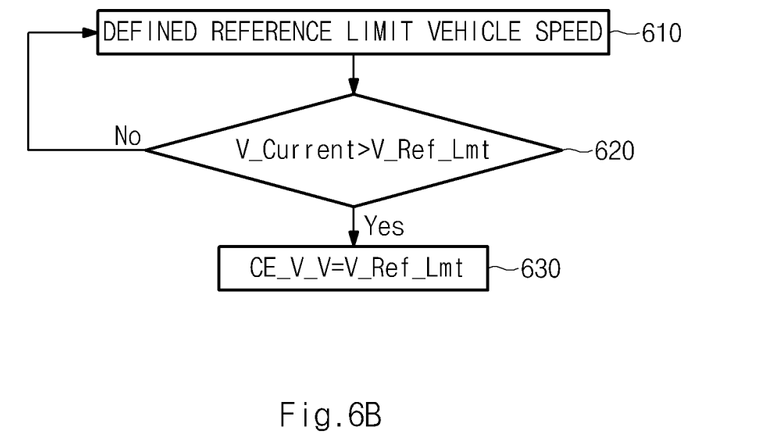

FIG. 6 is an exemplary diagram illustrating fourth vehicle target speed output of a vehicle speed excess stop determinator 270 according to an exemplary embodiment of the present invention. FIG. 6A illustrates an example of parking using the vehicle speed excess stop determinator 270, and FIG. 6B is an exemplary flowchart illustrating vehicle speed excess stop determination.

The vehicle speed excess stop determination may be performed to prevent collision occurring due to excessive speed of a vehicle operated by a driver or excessive speed due to erroneous operation by collision prevention logic based on vehicle speed. Accordingly, reference limit vehicle speed V_Ref_Lmt may be previously defined (e.g., 40 km/h) (610). The vehicle speed excess stop determinator 270 may determine whether currently measured vehicle speed information V_Current exceeds the defined reference limit vehicle speed V_Ref_Lmt (620). When currently measured vehicle speed information V_Current exceeds the defined reference limit vehicle speed V_Ref_Lmt, the vehicle speed excess stop determinator 270 may determine collision danger due to excessive speed, and output vehicle target speed CE_V_V as the reference limit vehicle speed (630). The process prevents excessive speed, thereby reducing the vehicle speed to suitable value.

In one embodiment, when the current vehicle speed exceeds the reference limit vehicle speed, the vehicle excess stop determination may output vehicle target speed. In another embodiment, the vehicle excess stop determination may not output vehicle target speed. In yet another embodiment, when the current vehicle speed does not exceed the reference limit vehicle speed, a null value may be output.

As illustrated through FIGS. 3 to 6, the system for preventing collision according to the present invention may perform collision determination by interworking with a processor executing map based collision determination, FRPAS-vehicle speed based collision determination, FRPAS stop determination, and vehicle speed excess stop determination, and output vehicle target speed through respective determinations. As one embodiment, all the determinators 210, 230, 250, and 270 outputting the vehicle target speed. When no collision danger is present (e.g., when there is no obstacle within a certain distance), a null value may be output. In another embodiment, only a determinator having determined a collision danger may output the vehicle target speed. When the first to fourth target vehicle speeds are output, the collision prevention operation manager 290 may receive the vehicle target speeds, and may compute minimum vehicle target speed of received vehicle target speeds as final vehicle target speed. Thus, resulting in a reduced vehicle speed with respect to an element having the greatest collision prevention danger of various elements through respective measuring devices. When the collision operation manager 290 determines final vehicle target speed, final vehicle target speed may be input to a control module 150 for controlling vehicle speed.

Figure 7:
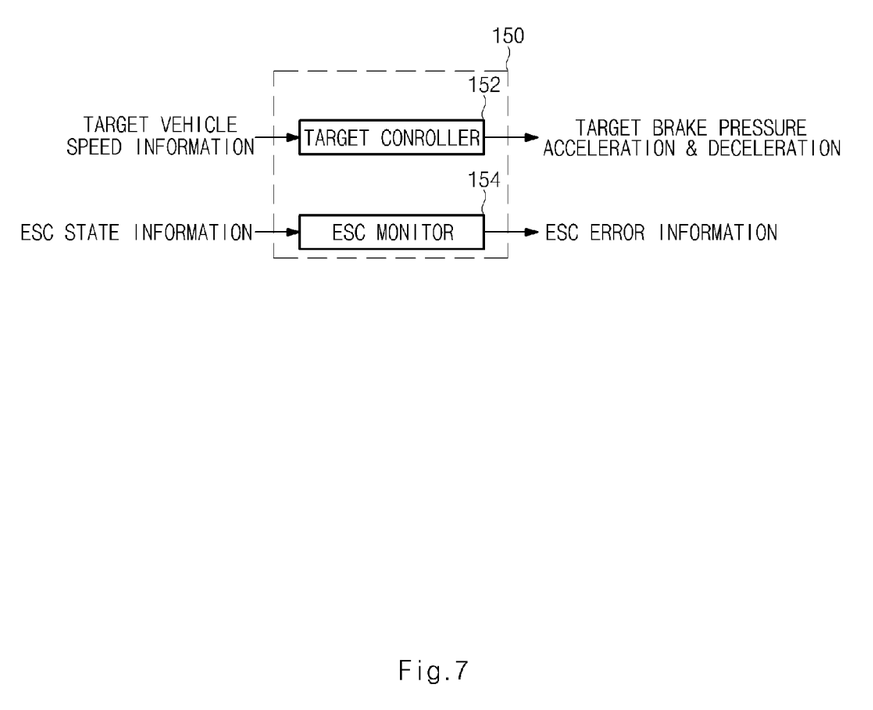
FIG. 7 is an exemplary block diagram illustrating a breaking control module 150 according to an exemplary embodiment of the present invention.

FIG. 7 is an exemplary block diagram illustrating a breaking control module 150 according to an exemplary embodiment of the present invention. The braking control module 150 may include a target controller 152 and an ESC monitor 154. The braking control module 150 may receive ESC state information and final vehicle target speed information (i.e., vehicle target speed information of FIG. 7) as input information. ESC state information refers to stat information from a general ESC.

The target controller 152 may receive vehicle target information. The vehicle target information refers to final vehicle target information computed from the collision estimator 100. The target controller 152 may output a brake pressure value or acceleration and deceleration values according to a brake actuator type to control a vehicle to a corresponding vehicle target speed. In particular, through vehicle speed control, an existing parking support system may output an alarm sound with respect to an obstacle to attract a user's attention and to provide active control. Further, since suitable vehicle speed capable of preventing collision may be determined and controlled through various determination factors, a driver's acceleration and deceleration less than or equal to an appropriate value remains unadjusted and increase of vehicle speed greater than the appropriate value may be suppressed.

The ESC monitor 154 may receive ESC state information to determine an error. The ESC is a device for controlling a position of a vehicle body, and for determining whether an error may occur during braking. In one embodiment, when an error occurs in the brake, the ESC monitor 154 may output ESC error information, and may maintain a brake pressure or acceleration and deceleration of the vehicle.

As described hereinabove, according to a system and a method for preventing collision in accordance with the present invention, since collision danger between a subject vehicle and an obstacle may be determined using a distance sensor and various vehicle and environment information, collision sensing may be substantially realized. Further, through active vehicle speed control, the present invention may prevent collision with peripheral obstacles due to an erroneous operation and wrong determination of the driver.

In detail, the present invention may determine appropriate vehicle speed capable of preventing collision based on a collision danger determination result, and vehicle speed less than an appropriate value may remain unadjusted. Only increase of vehicle speed greater than the appropriate value may be suppressed. In addition, when a sudden brake is required, vehicle target speed of zero is output to implement a sudden brake of the vehicle.

While the present invention has been particularly shown and described with reference to exemplary embodiments thereof, it will be understood by those of ordinary skill in the art that various modifications, additions and substitutions are possible, without departing from the spirit and scope of the present invention, as disclosed in the accompanying claims.

What is claimed is:

1. A system for preventing collision of a vehicle, the system comprising: a processor configured to execute:
   a map based collision determinator configured to output a first vehicle target speed using a map with respect to a parking space and a current location of the vehicle;
   a front and rear parking assist system (FRPAS)-vehicle speed based collision determinator configured to output a second vehicle target speed using a measured value of the FRPAS and a current vehicle speed;
   a FRPAS stop determinator configured to output a third vehicle target speed using the measured value of the FRPAS;
   a vehicle speed excess stop determinator configured to determine whether the current vehicle speed exceeds a preset reference vehicle speed and to output a fourth vehicle target speed; and
   a collision prevention operation manager configured to receive at least one of the first vehicle target speed, the second vehicle target speed, the third vehicle target speed, and the fourth vehicle target speed and to compute a final vehicle target speed corresponding to input target speeds to prevent collision between the vehicle and an obstacle,
   wherein the map based collision determinator acquires obstacle location information using the current location of the vehicle and generates the map including the obstacle location information;
   wherein a braking control module configured to receive the computed final vehicle target speed and to brake the vehicle, substantially equating the current vehicle speed to the final vehicle target speed.

2. The system of claim 1, wherein the braking control module is further configured to brake the vehicle using at least one of a brake pressure value and acceleration and deceleration values.

3. The system of claim 1, wherein the map based collision determinator is further configured to:
   acquire distance information to the obstacle using the current location of the vehicle to form a parking space map;
   determine a first vehicle reference speed corresponding to the distance information to the obstacle; and
   output the first vehicle reference speed as the first vehicle target speed in response to the current vehicle speed exceeding the first vehicle reference speed.

4. The system of claim 1, wherein the FRPAS-vehicle speed based collision determinator is further configured to:
   acquire distance information to the obstacle from an FRPAS module,
   determine a second vehicle reference speed corresponding to the distance information to the obstacle, and
   output the second vehicle reference speed as the second vehicle reference speed in response to the current vehicle speed exceeding the second vehicle reference speed.

5. The system of claim 1, wherein the FRPAS stop determinator is further configured to acquire distance information to the obstacle from an FRPAS module, and output the third vehicle target speed as zero in response to the distance information to the obstacle exceeding a preset reference distance.

6. The system of claim 1, wherein the vehicle speed excess stop determinator is further configured to output a vehicle reference limit speed as the fourth vehicle target speed in response to the current vehicle speed exceeding the vehicle reference limit speed.

7. The system of claim 1, wherein the collision prevention operation manager is further configured to determine a vehicle minimum target speed of the first vehicle target speed, the second vehicle target speed, the third vehicle target speed, and the fourth vehicle target speed as the final vehicle target speed.

8. A method for preventing collision of a vehicle, the method comprising:
   outputting, by a map based collision determinator, a first vehicle target speed using a map corresponding to a parking space and a current location of the vehicle;
   outputting, by a front and rear parking system (FRPAS)-vehicle sped based collision determinator, a second vehicle target speed using a measured value of a FRPAS and a current vehicle speed;
   outputting, by a FRPAS stop determinator, a third vehicle target speed using the measured value of the FRPAS;
   determining, by a vehicle speed excess stop determinator, whether the current vehicle speed exceeds a preset reference vehicle speed and outputting a fourth vehicle target speed; and
   receiving, at a collision prevention operation manager, at least one of the first vehicle target speed, the second vehicle target speed, the third vehicle target speed, and the fourth vehicle target
   speed and computing a final vehicle target speed corresponding to input target speeds to prevent collision between the vehicle and an obstacle,
   wherein the map based collision determiner acquires obstacle location information using the current location of the vehicle and generates the map Including the obstacle location information
   receiving, at a braking control module, the computed final vehicle target speed and braking the vehicle, thereby corresponding the current vehicle speed to the final vehicle target speed.

9. The method of claim 8, further comprising braking the vehicle, by the braking control module, using at least one of a brake pressure value and acceleration and deceleration values.

10. The method of claim 8, wherein the outputting of the first vehicle target speed further comprises:
    acquiring, by the map based collision determinator, distance information to the obstacle using the current location of the vehicle to form a parking space map,
    determining, by the map based collision determinator, a first vehicle reference speed corresponding to the distance information to the obstacle, and
    outputting, by the map based collision determinator, the first vehicle reference speed as the first vehicle target speed in response to the current vehicle speed exceeding the first vehicle reference speed.

11. The method of claim 8, wherein the outputting of the second vehicle target speed further comprises:
- acquiring, by the FRPAS-vehicle speed based collision determinator, distance information to the obstacle from an FRPAS module;
- determining, by the FRPAS-vehicle speed based collision determinator, second vehicle reference speed corresponding to the distance information to the obstacle; and
- outputting, by the FRPAS-vehicle speed based collision determinator, the second vehicle reference speed as the second vehicle reference speed in response to the current vehicle speed exceeding the second vehicle reference speed.

12. The method of claim 8, wherein the outputting of the third vehicle target speed further comprises:
- acquiring, by the FRPAS stop determinator, distance information to the obstacle from an FRPAS module; and
- outputting, by the FRPAS stop determinator, the third vehicle target speed as zero in response to the distance information to the obstacle exceeding a preset reference distance.

13. The method of claim 8, wherein determining whether the current vehicle speed exceeds the preset reference vehicle speed further comprises: outputting, by the vehicle speed excess stop determinator, a vehicle reference limit speed as the fourth vehicle target speed in response to the current vehicle speed exceeding the vehicle reference limit speed.

14. The method of claim 8, wherein receiving of the at least one of the first vehicle target speed, the second vehicle target speed, the third vehicle target speed, and the fourth vehicle target speed further comprises determining, by the collision prevention operation manager, a vehicle minimum target speed of the first vehicle target speed, the second vehicle target speed, the third vehicle target speed, and the fourth vehicle target speed as the final vehicle target speed.

15. A non-transitory computer readable medium containing program instructions executor by a processor, the computer readable medium comprising:
- program instructions outputting a first vehicle target speed using a map corresponding to a parking space and a current location of the vehicle;
- program instructions outputting a second vehicle target speed using a measuring value of a front and rear parking assist system (FAPAS) and a current vehicle speed;
- program instructions outputting a third vehicle target speed using the measured value of the FRPAS;
- program instructions determining whether the current vehicle speed exceeds a preset reference vehicle speed, to output a fourth vehicle target speed; and
- program instructions computing a final vehicle target speed from at least one of the first vehicle target speed, the second vehicle target speed, the third vehicle target speed, and the fourth vehicle target speed, corresponding to input target speeds to prevent collision between the vehicle and an obstacle,
- wherein the map based collision determinator acquires obstacle location information using the current location of the vehicle and generates the map including the obstacle location information
- wherein the program instructions computing a final vehicle target speed to brake the vehicle, thereby equating the current vehicle speed with the final vehicle target speed.

16. The non-transitory computer readable medium of claim 15, further comprising program instructions braking the vehicle using at least one of a brake pressure value and acceleration and deceleration values.

17. The non-transitory computer readable medium of claim 15, further comprising:
- program instructions forming a parking space map using acquired distance information to the obstacle obtained from the current location of the vehicle;
- program instructions determining a first vehicle reference speed corresponding to the distance information to the obstacle; and
- program instructions outputting the first vehicle reference speed as the first vehicle target speed in response to the current vehicle speed exceeding the first vehicle reference speed.

18. The non-transitory computer readable medium of claim 15, further comprising:
- program instructions determining a second vehicle reference speed corresponding to distance information to the obstacle; and
- program instructions outputting the second vehicle reference speed as the second vehicle reference speed in response to the current vehicle speed exceeding the second vehicle reference speed.

19. The non-transitory computer readable medium of claim 15, further comprising program instructions outputting the third vehicle target speed as zero in response to the distance information to the obstacle exceeding a present reference distance.

20. The non-transitory computer readable medium of claim 15, further comprising program instructions outputting a vehicle reference limit speed as the fourth vehicle target speed in response to the current vehicle speed exceeding the vehicle reference limit speed.

21. The non-transitory computer readable medium of claim 15, further comprising program instructions determining a vehicle minimum target speed of the first vehicle target speed, the second vehicle target speed, the third vehicle target speed, and the fourth vehicle target speed as the final vehicle target speed.

* * * * *